United States Patent [19]
Ames

[11] 3,789,648
[45] Feb. 5, 1974

[54] PORTABLE TUBE EXPANDER

[75] Inventor: Ward A. Ames, Danville, Ill.

[73] Assignee: Tridan Tool & Machine, Inc., Danville, Ill.

[22] Filed: Dec. 27, 1972

[21] Appl. No.: 318,927

Related U.S. Application Data

[63] Continuation-in-part of Ser. No. 179,060, Sept. 9, 1971, abandoned.

[52] U.S. Cl.................. 72/316, 29/202 D, 72/457, 113/1 C
[51] Int. Cl............................................. B21d 53/00
[58] Field of Search..... 72/457, 393, 293, 316, 318; 29/157.3 R, 157.3 A, 157.3 B, 202 D, 157.4; 113/1 C

[56] References Cited
UNITED STATES PATENTS

| | | | |
|---|---|---|---|
| 1,646,384 | 10/1927 | Bergstrom........................ | 29/202 D |
| 1,818,593 | 8/1931 | Walworth........................... | 113/1 C |
| 1,987,608 | 1/1935 | Dewald............................. | 29/157.4 |
| 2,234,863 | 3/1941 | Heetkamp........................ | 72/316 |
| 2,307,355 | 1/1943 | Bredeson........................ | 113/118 A |
| 2,631,645 | 3/1953 | Friedman......................... | 29/202 D |
| 3,021,596 | 2/1962 | Yowell............................. | 72/338 |
| 3,482,399 | 12/1969 | Davidson........................ | 29/157.3 B |
| 3,628,227 | 12/1971 | Blackburn....................... | 29/202 D |

*Primary Examiner*—Charles W. Lanham
*Assistant Examiner*—Gene P. Crosby
*Attorney, Agent, or Firm*—Woodard, Weikart, Emhardt & Naughton

[57] ABSTRACT

A portable device for expanding tubes. In one embodiment, a pair of movable jaws are pivotally mounted to a block and are spring biased together so as to engage the periphery of the tubes to be expanded. A pair of pistons with rods are slidable within hollow cylinders attached to the block. Each piston rod has a ball-shaped end which is positioned between the movable jaws in the retracted position with each end extendable therefrom into the tubes. A pair of shafts extend sealingly into the pair of hollow cylinders. By moving the shafts further into the hollow cylinders the length of travel of each piston is decreased. The pistons and headed ends are movable in unison together by the application of hydraulic pressure on either side of the pistons. In the preferred embodiment, the rods used to expand the tubes are driven by wheels with aligned peripheral grooves which engage the outer surfaces of the rods. In one version, a pair of wheels are coupled by gears to a hydraulic motor whereas in another version two pairs of wheels are coupled by a gear and chain combination to a hydraulic motor. In the preferred embodiment, the rods extend through a housing in which the wheels are rotatably mounted with the length of travel controlled by stop blocks mounted to the rods which contact the housing when the rods are extended the desired length.

18 Claims, 15 Drawing Figures

PATENTED FEB 5 1974

3,789,648

INVENTOR.
WARD A. AMES
BY
Woodard, Weikart, Emhardt & Naughton
ATTORNEYS

INVENTOR.
WARD A. AMES
BY
Woodard, Weikart, Emhardt & Naughton
ATTORNEYS

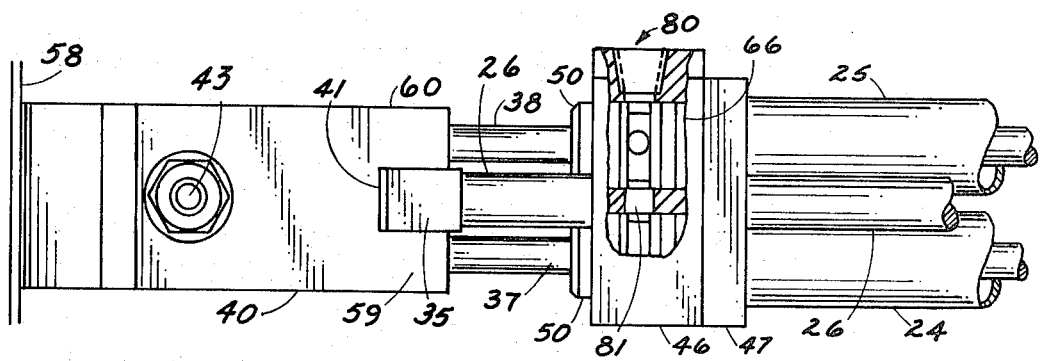
FIG. 5
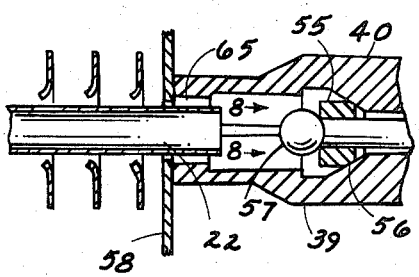
FIG. 6
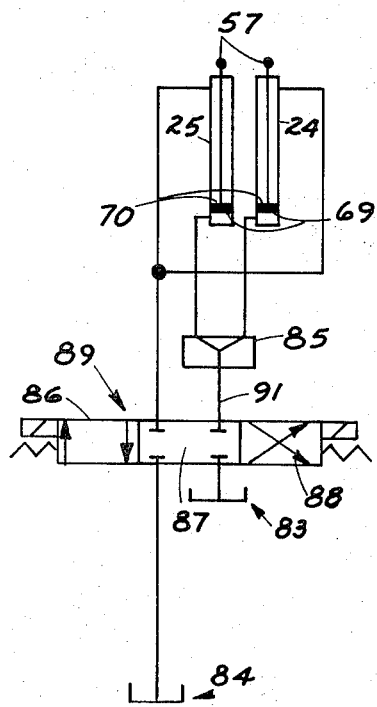
FIG. 7
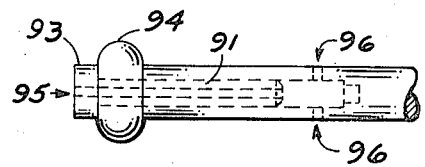
FIG. 8
FIG. 9

PORTABLE TUBE EXPANDER

CROSS REFERENCE to RELATED APPLICATION

This is a continuation-in-part of my U.S. Pat. application, Ser. No. 179,060, now abandoned, filed Sept. 9, 1971 and entitled Portable Tube Expander.

BACKGROUND OF THE INVENTION

1. Field of the Invention

This invention is in the field of tube expanders.

2. Description of the Prior Art

In heat exchangers and other similar devices, fins are mounted to tubes. It is the practice to fit the fins onto the tubes and to then expand the tubes so as to create a secure mechanical bond between the fins and the tubes. The mechanical bond provides an efficient means of transferring heat either to or from a medium circulated within the tubes while air or other gas is passed over the fins. It is desirable to expand the tubes to a larger outside diameter than the inside diameter of the fin holes receiving the tubes to create a very tight bond. The most popular means of constructing such heat exchangers is to form tubes into a U-shaped bend prior to inserting them into the fin stack.

There are several special machines and devices which are employed for tube expansion of finned heat exchangers. In general, the equipment employed is governed by the following factors: 1) the size of the coils to be expanded; 2) the total quantity of coils to be expanded; and 3) the quantity of each coil size to be expanded in a single production run. Coil producers who can justify the cost of the required machinery and whose overall volume, average production run quantity and coil sizes lend themselves to high-production type equipment, employ some type of expanding machinery which will expand one or more complete coils during a single cycle. Such machines, termed mechanical expanders, are designed in such a manner that they will expand all tubes of a heat exchanger in a single operational cycle. The basic principle employed involves the propulsion of multiple rods with bullet-shaped or ball-shaped tips through the tubes of the heat exchanger. These rod tips are of such a diameter and shape that they will expand the inner diameter of the tubes to the required dimension thus producing the desired interference between the outer tube diameters and the fin collars. Some mechanical expanders are designed such that they will push the expander rods and tips down through the heat exchanger. Others pull the rods and tips through the tubes. In most cases, a hydraulic cylinder is employed to furnish the necessary power. The mechanical expanders commercially available are automated and relatively complex and expensive equipment. A relatively large tube expander is disclosed in the U. S. Pat. No. 2,631,645 issued to Friedman. Another device is disclosed in the U.S. Pat. No. 3,021,596 issued to Yowell et al., which expands a very thin walled tubing which is positioned within a passage. Two portable devices for working metal are shown in the U. S. Pat. Nos. 1,753,677 issued to Andresen and 2,480,629 issued to Brinen.

Another method of expanding a tube involves filling the tube with water, fitting the open tube ends with special pressure-tightened chucks and then applying sufficient pressure to the water to bulge the tubes and expand it into an interference fit within the fin. This method has several disadvantages including the inherent inability to control the exact expansion of the tube. Another means of tube expansion employed is propulsion of a ball or bullet through the tube by means of water pressure, air pressure or oil pressure. It is possible to rupture the tube with this method and the bullet may become lodged within the tube.

Disclosed herein is a low cost portable tube expander which may be used in a low production setup. The expander disclosed herein has means whereby the length of the expanding stroke may be controlled depending upon the length of the tube to be expanded. In addition, one embodiment of the tube expander may be utilized to simultaneously expand both legs of a U-shaped bend in a uniform manner as will be described later in the specification.

SUMMARY OF THE INVENTION

One embodiment of the present invention is an apparatus for expanding tubes comprising a frame, a first rod slidably mounted to the frame, the rod having an enlarged end to move through and expand a first tube, first tube gripping jaws lockingly engageable peripherally to an end of the tube, the jaws mounted to the frame and having an open position when the enlarged end is lodged within and against the jaws and a closed tube gripping position whenever the enlarged end is positioned outside of the jaws, and first means mounted to the frame being operable to move the rod and the enlarged end through the jaws to open and close the jaws and to move the enlarged end through the tube.

It is an object of the present invention to provide a portable tube expander.

A further object of the present invention is to provide a tube expander which will simultaneously expand both legs of a U-shaped tube in a uniform manner.

Related objects and advantages of the present invention will be apparent from the following description.

BRIEF DESCRIPTION OF THE DRAWINGS

FIG. 5 is a fragmentary top view of the left end portion of the tube expander shown in FIG. 1.

FIG. 6 is a fragmentary view of the left portion of the tube expander shown in FIG. 2 with the movable jaws shown in the open position.

FIG. 7 is a schematic representation of a hydraulic circuit for operating the tube expander of FIG. 1.

FIG. 8 is an end view of headed end 57 shown in FIG. 6 looking in the direction of arrows 8—8.

FIG. 9 is a side view of an alternate embodiment of an expander rod.

DESCRIPTION OF THE PREFERRED EMBODIMENTS

Figure 1:
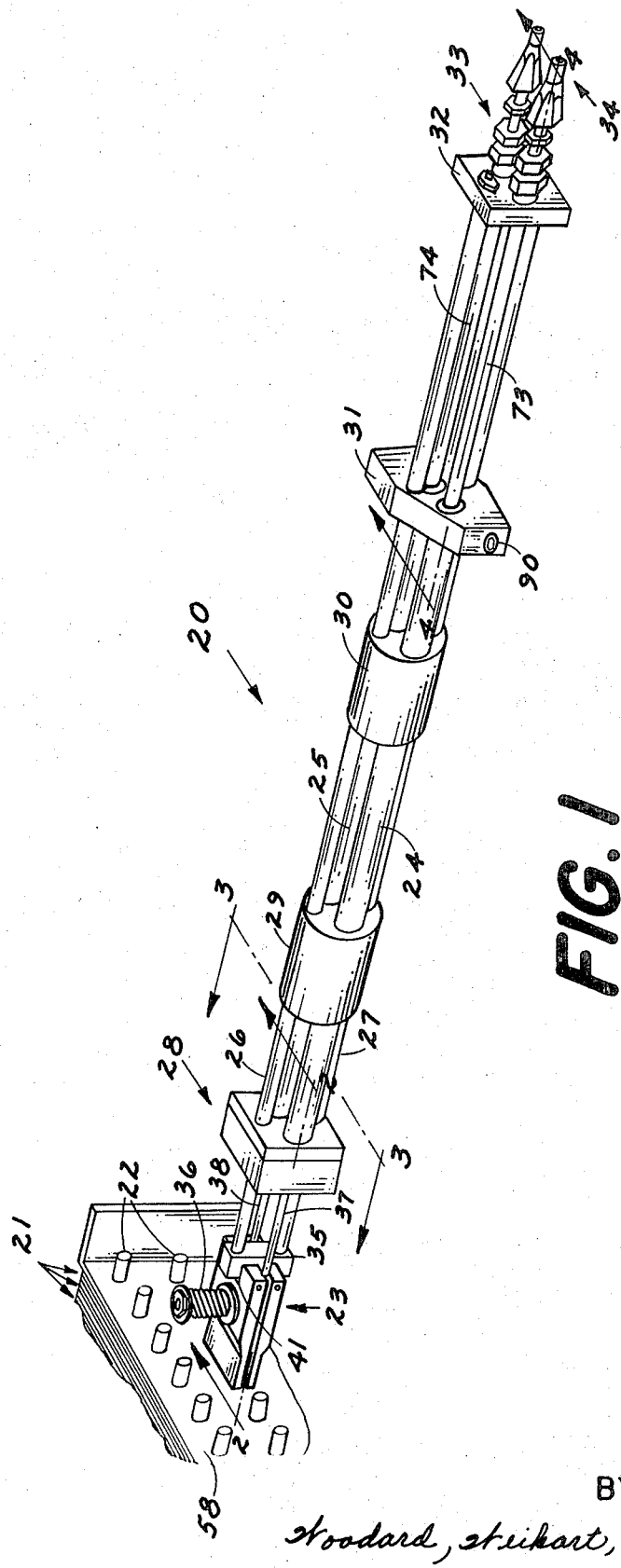
FIG. 1 is a perspective view of an alternate embodiment of a tube expander incorporating the present invention shown connected to a heat exchanger.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an alternate embodiment of a portable tube expander 20 for expanding tubes 22 which extend through a plurality of heat exchanging fins 21. A tube expander will be described herein for simultaneously expanding two tubes; however, it is understood that the present invention also includes and contemplates a tube expander for expanding a single tube or for expanding a plurality of tubes greater than two.

Figure 2:
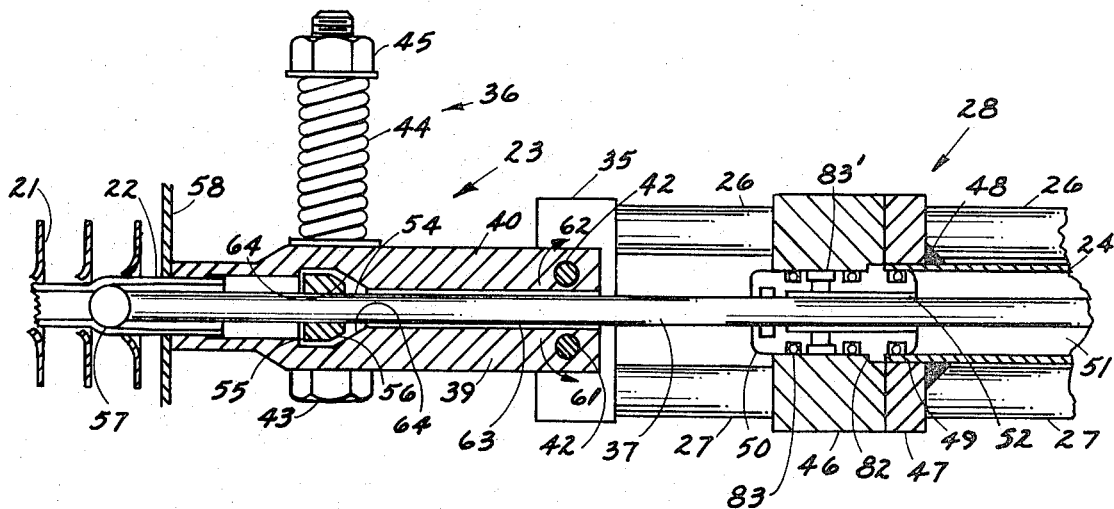
FIG. 2 is an enlarged fragmentary cross sectional view taken along the line 2—2 of FIG. 1 and viewed in the direction of the arrows.
Figure 3:
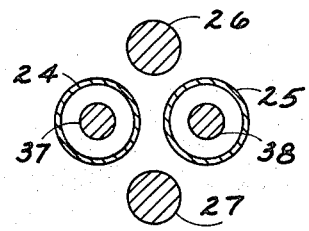
FIG. 3 is an enlarged cross sectional view taken along the line 3—3 of FIG. 1 and viewed in the direction of the arrows.

Tube expander 20 has a pair of hollow cylinders 24 and 25 fixedly connected at either end to a chambered body 28 and a lock plate 31. A pair of tie rods 26 and 27 extend through body 28 and lock plate 31 having ends fixedly connected to end plate 32 and block 35. A pair of expander jaws 23 are pivotally mounted to block 35 and are spring biased together by spring means 36. A pair of rods 37 and 38 are respectively slidable from cylinders 24 and 25 into tubes 22 for the expansion thereof. Rods 37 and 38 are movable by hydraulic pressure applied into cylinders 24 and 25 at either end thereof. FIG. 2 is a fragmentary enlarged cross sectional view of the left portion of the tube expander shown in FIG. 1. Expander jaws 23 have a top plate 40 and a bottom plate 39 with proximal ends pivotally connected to member 35 by pins 42. PLates 40 and 39 are each provided with a slot 41 (FIG. 5) for receiving member 35. Thus, ears 59 and 60 are formed on plates 40 and 39 with a pin 42 extending through each ear of each plate into member 35.

Spring means 36 biases the plates 40 and 39 together. The spring means has a bolt 43 extending through plates 39 and 40 with a helical spring 44 being received on the shank of the bolt and being compressed between plate 40 and nut 45 threaded onto the end of the bolt. Bolt 43 is positioned between piston rods 37 and 38 which are slidable from the movable jaws. The plates are spaced apart having a separate passage for receiving the shank of the piston rods 37 and 38. One such passage 63 is shown in FIG. 2 freely receiving piston rod 37. Each passage 63 opens into a separate chamber 54 having a collar positioned therein. One such collar 55 is shown in FIG. 2 being freely mounted to rod 37. A similar collar positioned in a chamber is slidably mounted on rod 38. A cam surface 56 is formed on each collar and contacts cam surfaces 64 of plates 39 and 40 when the piston rods are retracted.

To engage tubes 22 with expander jaws 23, piston rods 37 and 38 are retracted until their ball-shaped headed ends 57 contact collars 55 (FIG. 2) forcing cam surfaces 56 to contact cam surfaces 64 causing the plates 39 and 40 to pivot about pins 42 respectively in the direction of arrows 61 and 62. The expander jaws will therefore be open as shown in FIG. 6 allowing the expander jaws to be positioned adjacent coil end sheet 58 with tubes 22 extending between plates 39 and 40 into a passage 65 (FIG. 6). Piston rods 37 and 38 are then forced to the left as viewed in FIG. 6 relieving the pressure exerted between cam surfaces 56 and 64 and allowing plates 39 and 40 to pivot in a direction opposite of arrows 61 and 62 (FIG. 2) due to the pressure exerted by spring 44. Continued leftward movement of piston rods 37 and 38 causes headed ends 57 to enter tubes 22. The outside diameter of headed ends 57 of rods 37 and 38 is greater than the inside diameter of tubes 22. Previously, fins 21 have been positioned onto tubes 22 with the fin holes receiving tubes 22 being slightly larger than the outside diameter of tubes 22. Thus, as the headed ends 57 move through tubes 22, the tubes are expanded sufficiently so that the outside diameter of tube 22 increases greater than the diameter of the original fin hole receiving the tube. An interference fit between the fins and tubes 22 is therefore created providing for a strong mechanical connection. After headed ends 57 have passed through the length of tubes 22, the piston rods are retracted until the jaws open as shown in FIG. 6 and the process is completed. Suitable serrations may be provided on the inside surface of passage 65 so as to ensure against any slip between the expander jaws and tubes 22 when the jaws lockingly engage the periphery of the tubes.

Figure 4:
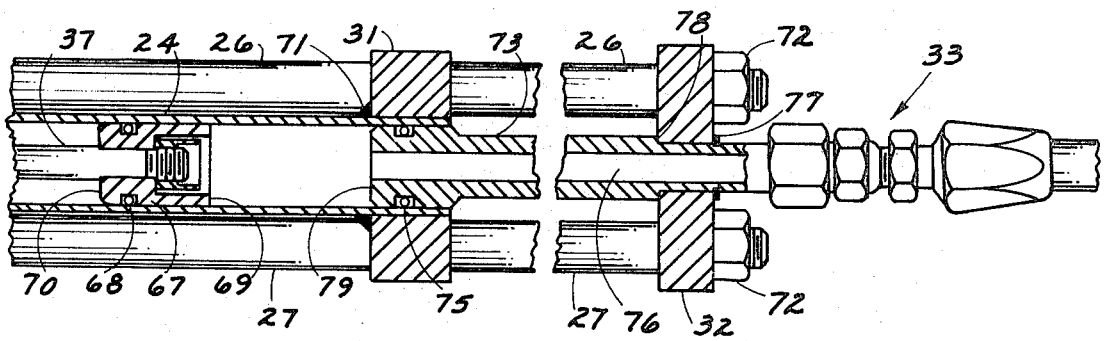
FIG. 4 is an enlarged fragmentary cross sectional view taken along the line 4—4 of FIG. 1 and viewed in the direction of the arrows.

Hollow cylinders 24 and 25 are fixedly connected to chambered body 28 (FIG. 1) and lock plate 31. The body 28 has a block 46 (FIG. 2) fixedly connected to plate 47 with cylinders 24 and 25 being connected to plate 47 by welds 48. Block 46 and plate 47 are provided with through-holes for allowing tie rods 26 and 27 to extend freely therethrough. Suitable bearings may be provided in block 46 for allowing relatively free movement between the tie rods and the block. Piston rods 37 and 38 extend through block 46 and plate 47 and respectively into hollow tubes 24 and 25. The ends of piston rods 37 and 38 opposite headed ends 57 are connected to pistons slidable within cylinders 24 and 25. For example, piston rod 37 is fixedly connected to piston 67 (FIG. 4) which is slidable in cylinder 24. Piston 67 is provided with an O-ring 68 to prevent any fluid passage between the piston and the cylinder. A similar piston is connected to piston rod 38. By applying hydraulic pressure on sides 69 of the pistons connected to rods 37 and 38, the headed ends 57 are forced to the left as viewed in the drawings. Likewise, by applying hydraulic pressure to sides 70 of the pistons connected to piston rods 37 and 38, the headed ends 57 are forced to the right as viewed in the drawing. Both hollow cylinders 24 and 25 are fixedly connected to lock plate 31 by welds 71 (FIG. 4). Tie rods 26 and 27 extend through lock plate 31 and are fixedly connected to end plate 32 by nuts 72. Plate 32 may be counterbored to receive the necked down ends of tie rods 26 and 27 with the ends of the rods being threaded so as to receive nuts 72. Rods 26 and 27 are fragmented in FIG. 4 to conserve drawing space.

A pair of hollow shafts 73 and 74 (FIG. 1) are fixedly connected to plate 32 and extend sealingly and slidably into, respectively, hollow cylinders 24 and 25. Shaft 73 will now be described, it being understood that a similar description applies to shaft 74. Shaft 73 (FIG. 4) has an O-ring 75 mounted on its distal end 79 preventing fluid escape from cylinder 24. The opposite end of shaft 73 is connected to fluid nozzle 33. The center 76 of the shaft is hollow allowing fluid passage between nozzle 33 and tube 24. The shafts 73 and 74 are fixedly mounted to end plate 32 being necked down at location 78 with a snap ring 77 being mounted on each shaft thereby preventing relative motion between the end plate and the shafts. Hydraulic pressure is applied to side 69 of the pistons within cylinders 24 and 25 by forcing hydraulic fluid through hoses 34 to nozzles 33 and into the cylinders. Hydraulic pressure is applied to sides 70 of the pistons within cylinders 24 and 25 by forcing hydraulic fluid through port 80 (FIG. 5) of block 46. The block is shown fragmented at 66 and the fluid nozzle is removed from port 80 for sake of clarity. Port 80 opens directly into the hole receiving piston rod 38 and then through passage 81 into the hole receiving piston rod 37. A pair of bushings 50 are sealingly mounted to block 46 preventing escape of fluid from the block. The piston rods extend freely through bushings 50 but are in sealing engagement therewith. O-rings 83 (FIG. 2) are mounted on bushings 50 preventing passage of fluid between the bushings and the block 46. Bushings 50 are enlarged adjacent hollow cylinders 24 and 25 forming ledges 82 (FIG. 2) which are retained adjacent plate 47 by block 46. The inside diameter of each bushing 50 is larger than the diameter of each piston rod thereby forming fluid passage 52 (FIG. 2). The hollow center 51 of cylinder 24 (FIG. 2) is in communication with the source of hydraulic pressure through passage 52, hole 81 and port 80. A plurality of holes 83' extend radially outward from passage 52 and are aligned with hole 81 so as to allow passage of fluid through hole 81, holes 83', passage 52 and into cylinder 24. The bushing receiving piston rod 38 is identical having a passage and a plurality of holes aligned with passage 81 and port 80. Thus, by applying fluid pressure through port 80, the force is applied equally to the pistons connected to rods 37 and 38.

FIG. 7 is a schematic representation of a hydraulic circuit for operating the tube expander. Shown are the hydraulic cylinders 24 and 25 with the piston rods having headed ends 57. Valve 89 has a position 86, 87 and 88 which are alignable with the fluid hoses connected to nozzles 33 and port 80. When position 86 of valve 89 is aligned with the fluid hoses, fluid pressure is routed from source 84 and through port 80 to sides 70 of the pistons thereby retracting headed ends 57. Simultaneously, fluid is drained from the hydraulic cylinders through nozzles 33 to drain 83. When position 87 of the valve is aligned with the fluid hoses, then headed ends 57 remain in a static condition. When position 88 of the valve is aligned with the input hoses by forcing the valve to the left as viewed in FIG. 7, then fluid pressure is routed to line 91 and through flow equalizer 85 to slides 69 of the pistons. Simultaneously, fluid is drained from sides 70 of the pistons to drain 83. Equalizer 85 ensures that an identical force is applied to each piston so that headed ends 57 are extended in unison through the tubes. A suitable pump is provided to force the fluid from source 84 through the hydraulic cylinders.

The tube expander described is particularly useful since the expander is portable. In addition, the length of the stroke of the piston rods may be easily controlled. Normally, relative movement is prevented between tie rods 26 and 27 and lock plate 31. Suitable lock screws 90 (FIG. 1) are threaded into plate 31 forcing a locking device against tie rods 26 and 27 and preventing movement with respect to plate 32. It is also possible to have screws 90 directly contact the tie rods. By loosening screws 90, one only being shown in FIG. 1, plate 32 may be moved toward plate 31 thereby forcing tie rods 26 and 27 through plate 31 and body 28 extending jaws 23 to the left of body 28 as shown in FIG. 1. Simultaneously, shafts 73 and 74 will extend further into cylinders 24 and 25 thereby limiting the rightward movement as viewed in FIG. 4 of the pistons connected to piston rods 37 and 38. Shafts 73 and 74 are slidable in unison towards and away from the pistons within hollow cylinders 24 and 25. As jaws 23 are moved away from body 28, headed ends 57 will also move with the jaws forcing the pistons connected to piston rods 37 and 38 toward body 28. Thus, the distance between body 28 and sides 70 of the pistons will be decreased limiting the distance which the headed ends may be extended from the jaws. Body 28 prevents movement of the pistons from the hydraulic cylinders. The stroke of the piston rods is thus controlled by adjusting the distance between plates 31 and 32. A pair of handles 29 and 30 (FIG. 1) are mounted on hydraulic cylinders 24 and 25 for facilitating the grasping of the tool.

FIG. 8 is an end view of headed end 57 shown in FIG. 6 looking in the direction of arrows 8 —8. In many cases, air pressure will increase within the tube to be expanded ahead of the headed end 57. This results as the headed end 57 moves through the tube thereby decreasing the internal volume in the tube portion which has not been expanded. Thus, grooves 92 are formed in the side of headed end 57 so as to allow the air ahead of the headed end to flow past the headed end. When expanding a U-shaped tube with a pair of expander rods, it is necessary to provide grooves 92 in only one of the headed ends 57. An alternate embodiment of the venting feature is shown in FIG. 9 wherein the expander rod 91 has a headed end 94 affixed thereto by fastener 93. A hole 95 extends through fastener 93 opening into the screw hole formed in rod 91. Holes 96 extend radially outward from the screw hole thereby allowing the air in front of the headed end to pass through holes 95 and 96 to a position rearwardly of the headed end.

Figure 10:
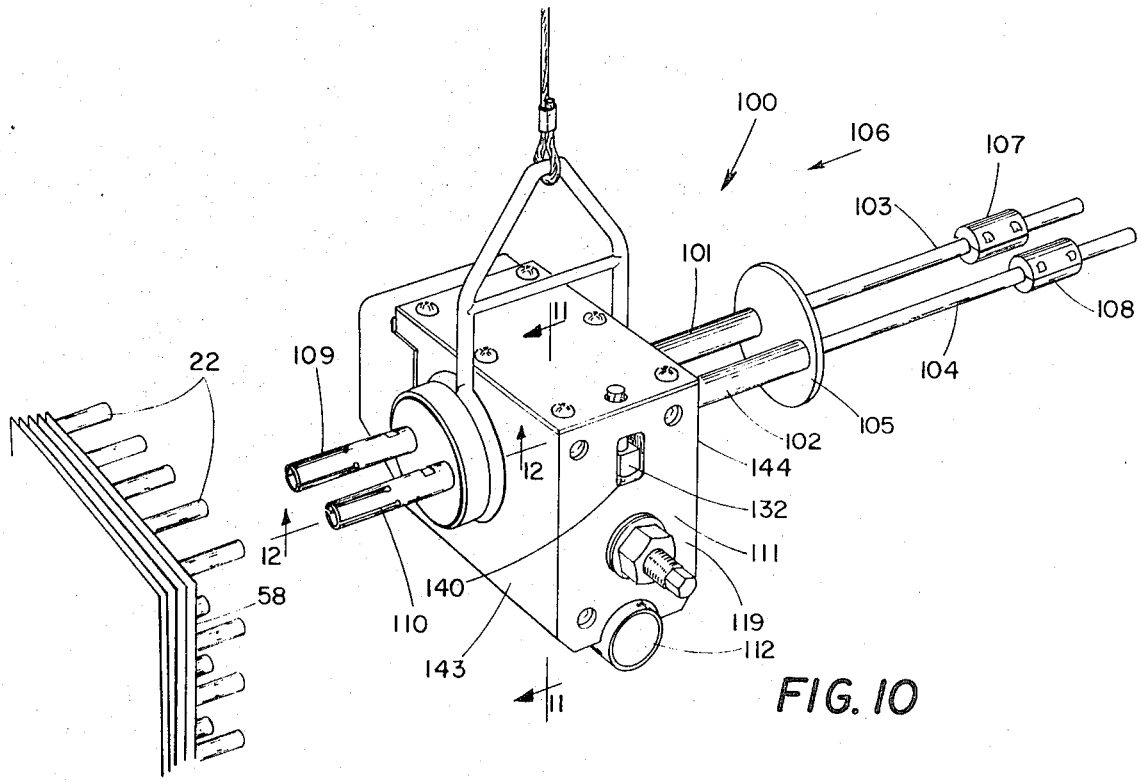
FIG. 10 is a perspective view of the preferred embodiment of a tube expander incorporating the present invention.

Referring now to FIG. 10, there is shown the preferred embodiment of the apparatus for expanding tubes 22. Apparatus 100 has a pair of rod supports 101 and 102 mounted thereto which slidably receive respectively rods 103 and 104. A plate 105 is fixedly mounted to the distal ends of supports 101 and 102 and limits the movement of rods 103 and 104 in the direction of arrow 106. A pair of adjustable stops 107 and 108 are respectively mounted to rods 103 and 104 and contact plate 105 when the rods are extending the maximum distance from movable jaws 109 and 110 mounted to frame 111.

Figure 11:
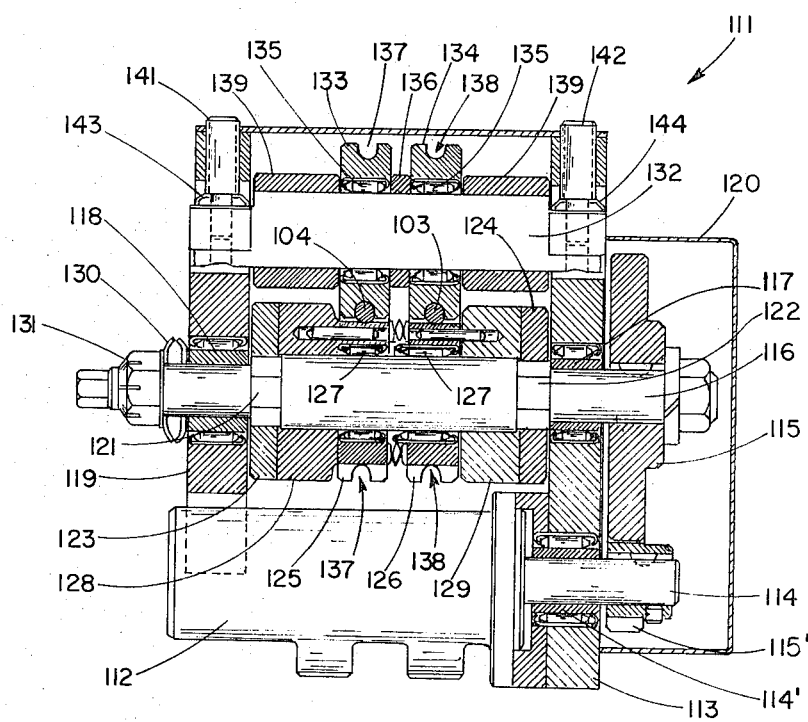
FIG. 11 is an enlarged cross sectional view taken along the line 11—11 of FIG. 10 and viewed in the direction of the arrows.

FIG. 11 is a cross sectional view taken along the line 11—11 of FIG. 10 and viewed in the direction of the arrows. Rods 104 and 103 are slidably mounted to frame 111 and have enlarged ends which are normally positioned within jaws 110 and 109 but are extendable therefrom to expand tubes 22. A means is provided which is mounted to frame 111 which is operable to move rods 103 and 104 thereby allowing the enlarged rod ends to move from the jaws in order to expand tubes 22. The means for moving rods 103 and 104 includes a hydraulic motor 112 which is secured to end plate 113 of frame 111. The rotatable drive shaft 114 of motor 112 extends through roller bearings 114' provided in plate 113. Gear 115' is fixedly mounted to shaft 114 and is in meshing engagement with gear 115 fixedly mounted to shaft 116. Shaft 116 is rotatably mounted in bearings 117 and 118 which are provided respectively in plates 113 and 119. Thus, by activating hydraulic motor 112, drive shaft 114 is caused to rotate thereby rotating shaft 116, via gears 115' and 115. Cover 120 is mounted to plate 113 so as to enclose gears 115' and 115.

Shaft 116 has a pair of hexagonally shaped sections 121 and 122 which are respectively received in hexagonally shaped holes provided in clutch plates 123 and 124. Thus, rotation of shaft 116 will cause rotation of clutch plates 123 and 124. A pair of rod driver gears 125 and 126 are rotatably mounted to shaft 116 by bearings 127 and are positioned between clutch plates 123 and 124. Rod driver gears 125 and 126 are fixedly pinned respectively to clutch pads 128 and 129, through which shaft 116 extends. Tension is applied to the clutches by a washer type spring 130 which is positioned between plate 119 and hexagonally shaped nut 131 threadedly mounted to shaft 116. Thus, rotation of shaft 116 causes rotation of rod driver gears 125 and 126.

Idler shaft 132 is mounted to plate 113 and 119 above shaft 116. A second pair of rod driver gears 133 and 134 are rotatably mounted by bearings 135 to idler shaft 132. The teeth of gear 133 are in meshing engagement with the teeth of gear 125 whereas the teeth of gear 134 are in meshing engagement with the teeth of gear 126. Each gear is provided with an outer circumferential edge having a groove therein which extends continuously around the gear. A portion of the outer circumferential edges of gears 125 and 133 are tangentially aligned and in contact with rod 104 which extends between the gears 125 and 126 being received by grooves 137 of the gears. Likewise, a portion of the outer circumferential edges of gears 126 and 134 are tangentially aligned and in contact with rod 103 which extends between gears 136 and 134 being received by grooves 138. As the rod driver gears are rotated, the surfaces forming grooves 137 and 138 are in contact with the periphery of rods 104 and 103 so as to propel the rods through frame 111.

Gears 133 and 134 are positioned by spacers 139 through which shaft 132 projects. The opposite ends of idler shaft 132 are received in slots provided in plates 119 and 113. For example, plate 119 (FIG. 10) is provided with slot 140 through which shaft 132 projects. Pressure is applied to rods 103 and 104 via gears 133 and 134 by set screws 141 and 142 (FIG. 11) which project into idler shaft 132. Springs 143 and 144 are positioned respectively between idler shaft 132 and the enlarged heads of set screws 141 and 142. Thus, by tightening the set screws, downward force is applied to the idler shaft by springs 143 and 144 thereby forcing the rod driver gears more firmly against rods 103 and 104.

Plates 113 and 119 are fixedly secured to the side walls 143 (FIG. 10) and 144. Hollow rod supports 101 and 102 are mounted to wall 144 and are aligned with the mutually facing grooves of gears 125 and 133 and gears 126 and 134. Likewise, jaws 109 and 110 are mounted to walls 143 and are aligned with rod supports 101 and 102. Thus, rods 103 and 104 pass through rod supports 101 and 102, between the rod driver gears and then through jaws 109 and 110.

Figure 12:
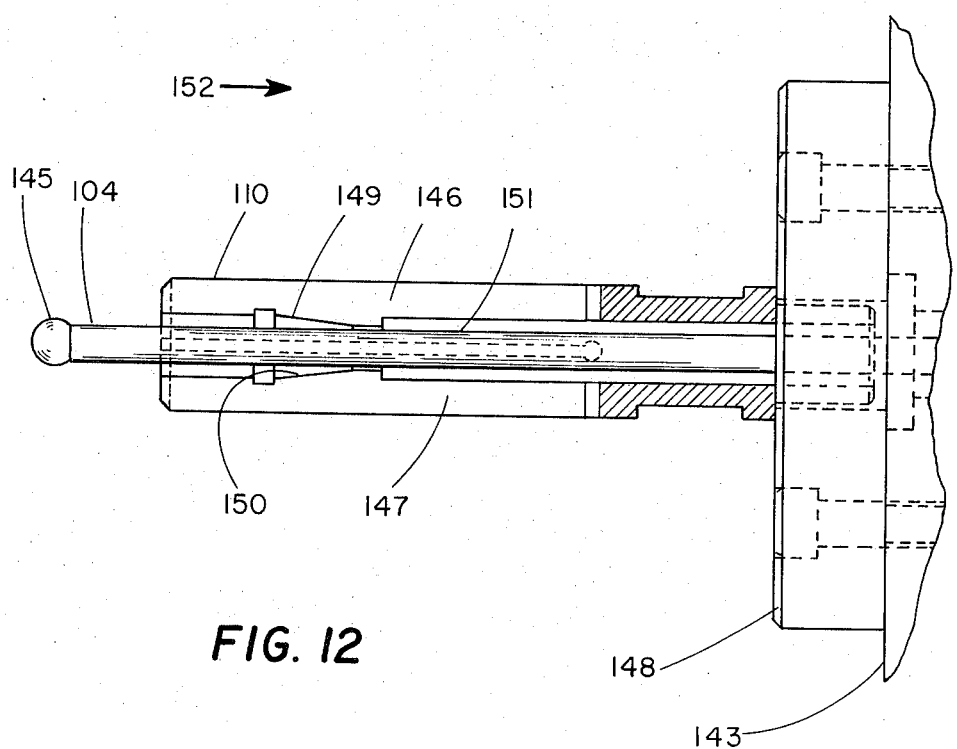
FIG. 12 is an enlarged cross sectional view taken along the line 12—12 of FIG. 10 and viewed in the direction of the arrows with the rod extended.

FIG. 12 is a cross sectional view of jaw 110 which is identical to jaw 109. The enlarged end 145 of rod 104 is shown projecting outwardly from jaw 110. Jaw 110 is bifurcated forming a top half portion 146 and a bottom half portion 147 each portion in turn being bifurcated having distal ends spaced apart and attached proximal ends which are mounted to wall 143 by end plate 148. Jaw 110 has a pair of converging surfaces 149 and 150 which are contactable against enlarged end 145 as the rod is withdrawn in the direction of arrow 152. Thus, in order to engage tubes 22 (FIG. 10) with the jaws, the rods are withdrawn until the enlarged end of each jaw contacts the converging surfaces within each jaw thereby forcing the bifurcated portions apart and allowing the tubes 22 to be inserted into the movable jaws. Rods 103 and 104 are then caused to move in a direction opposite of arrow 152 thereby allowing the jaws to tightly grip tubes 22.

Figure 13:
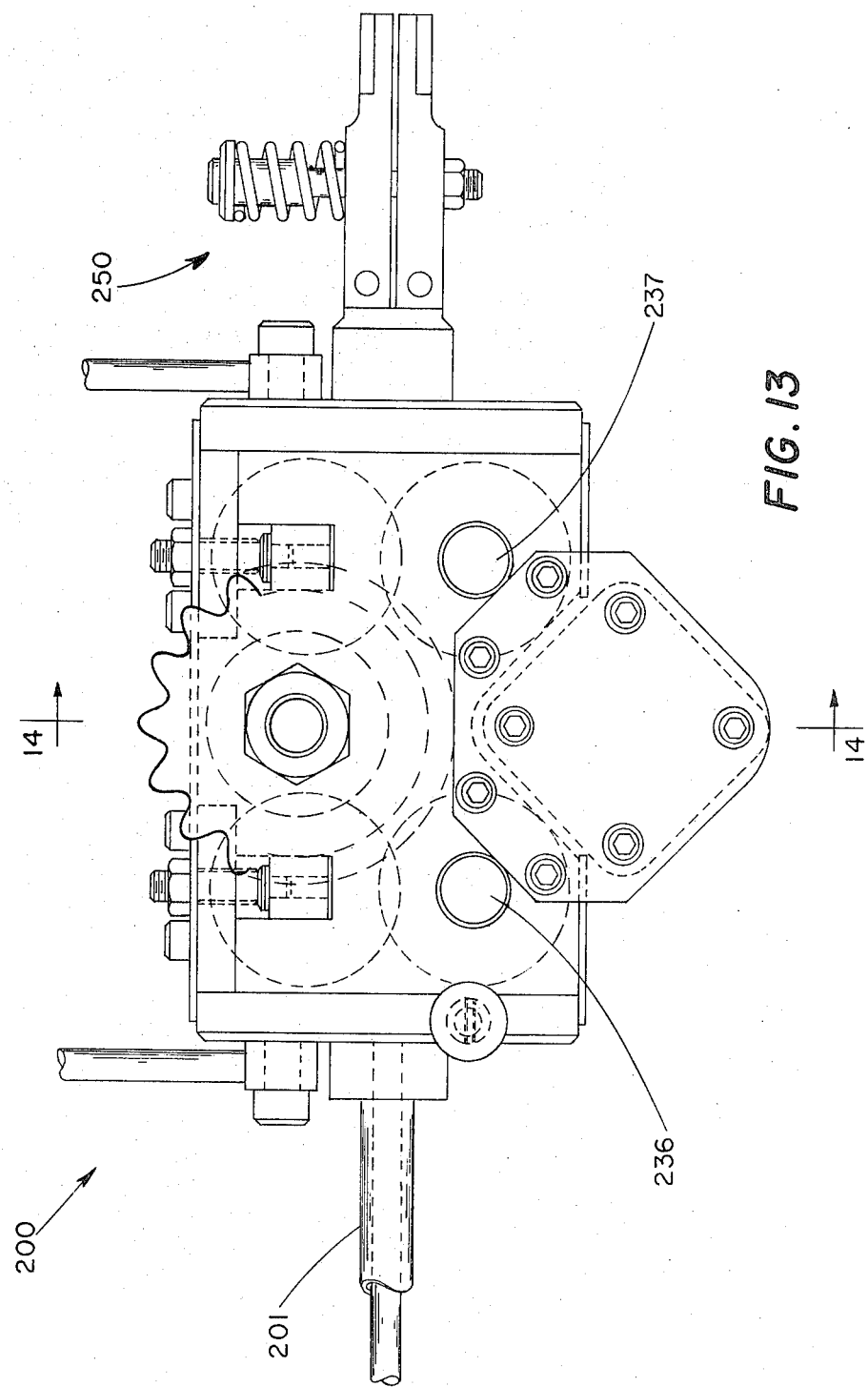
FIG. 13 is a side view of a tube expander similar to the expander shown in FIGS. 10 and 11 only having two sets of drive wheels in lieu of one set.
Figure 14:
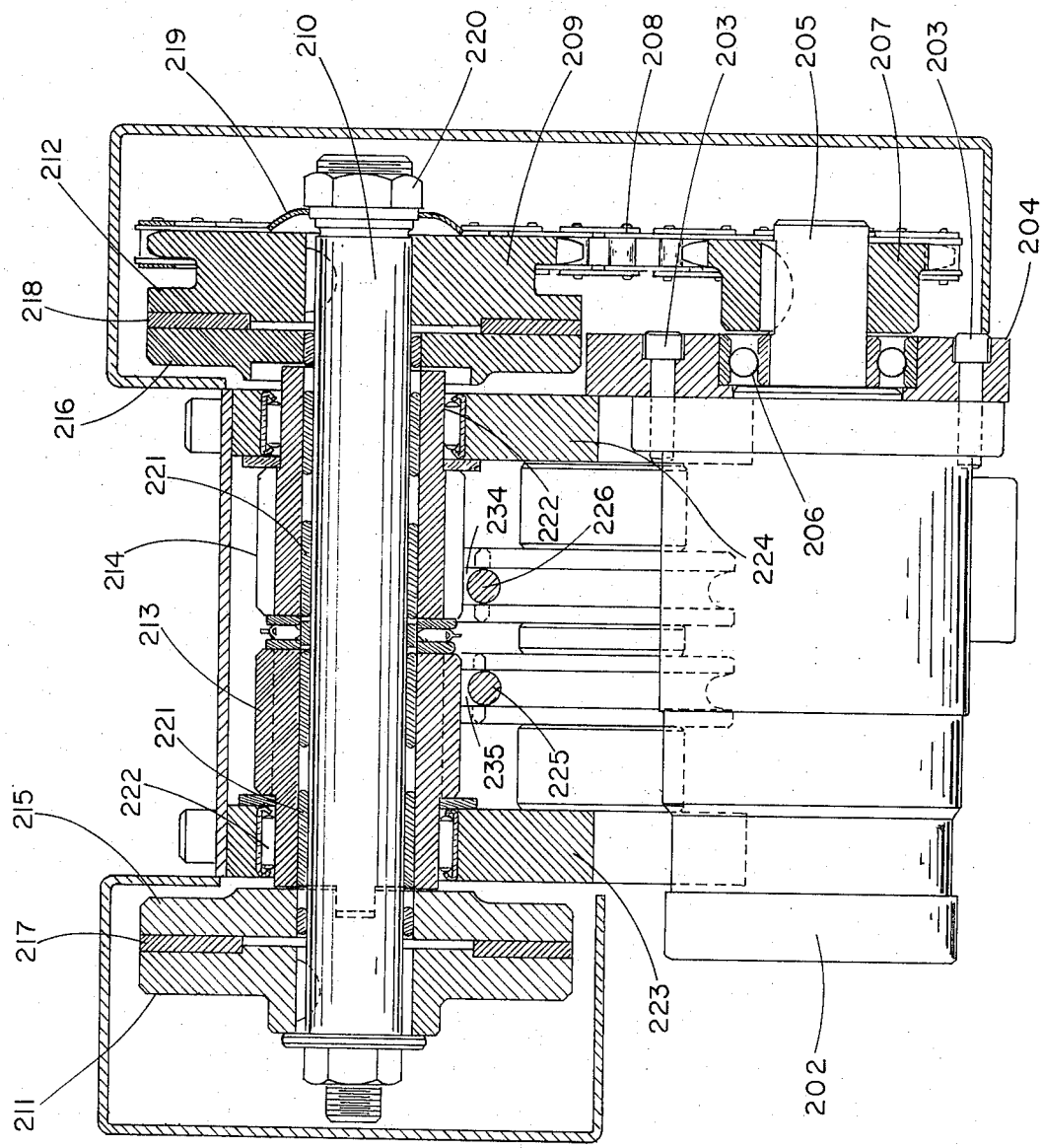
FIG. 14 is an enlarged cross sectional view taken along the line 14—14 of FIG. 13 and viewed in the direction of the arrows.
Figure 15:
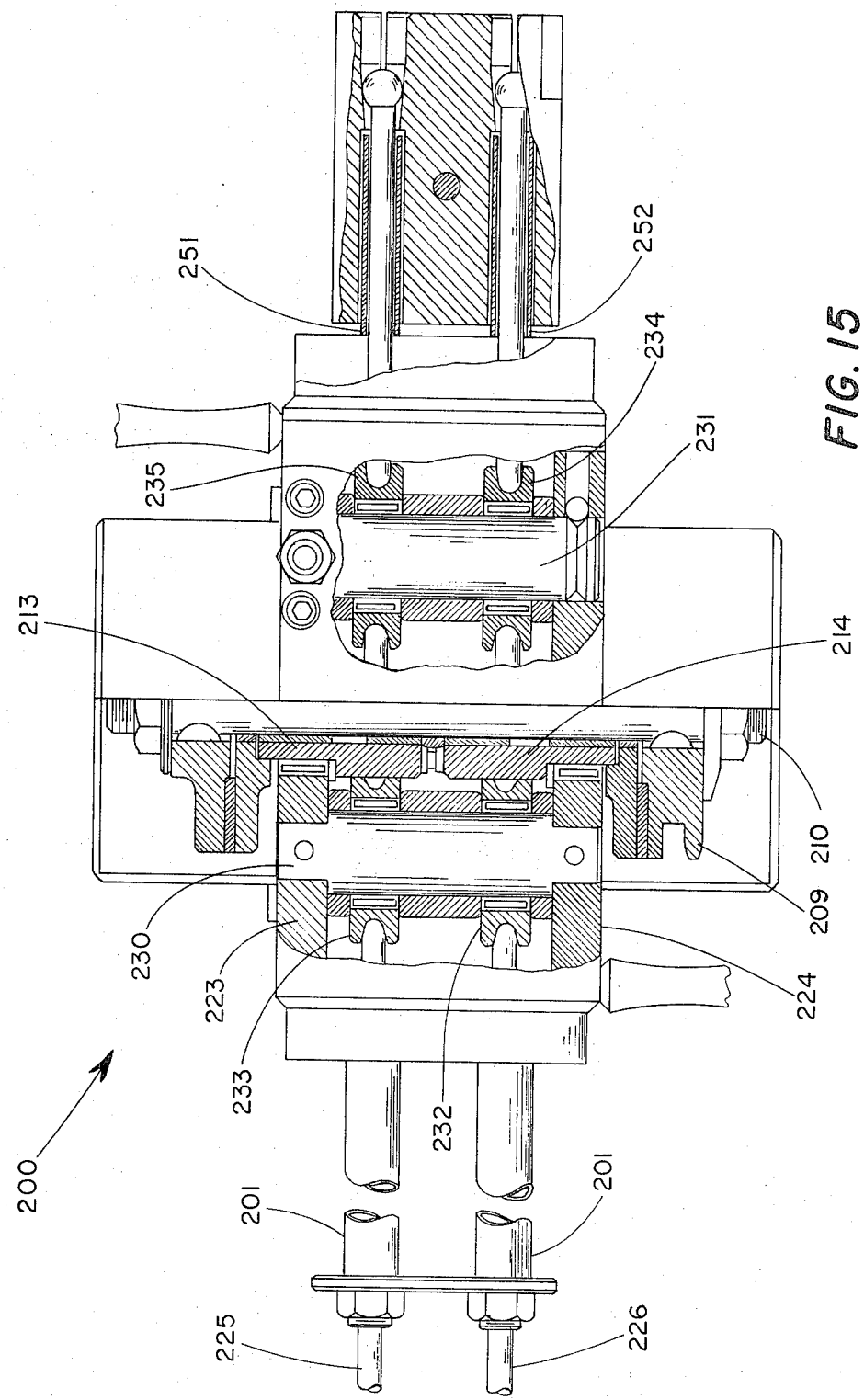
FIG. 15 is a top fragmentary view of the tube expander of FIG. 13.

Referring now to FIGS. 13 through 15, there is shown an alternate embodiment of the apparatus for expanding tubes. Apparatus 200 is similar to apparatus 100 shown in FIGS. 10 and 11 with the exception that additional rod driver gears are utilized to move the rods through the frame and movable jaws. In addition, the hydraulic motor is coupled to the rod driver gears shaft by a gear and chain combination in lieu of the gear to gear combination described for rotating the rod driver gear shaft 116 of apparatus 100. Apparatus 200 has a pair of hollow rod supports 201. Hydraulic motor 202 is mounted by bolts 203 to end plate 204. The rotatable output shaft 205 of hydraulic motor 202 extends through bearings 206 provided in plate 204. A gear 207 is fixedly mounted to the distal end of shaft 205 and is in meshing engagement with a continuous roller chain 208 which also extends around and is in meshing engagement with gear 209 fixedly mounted to rod 210. Fixedly mounted to rod 210 are clutch drive plates 211 and 212. A pair of drive gears 213 and 214 are mounted to shaft 210 and are keyed to clutch plates 215 and 216 through which rod 210 extends. Clutch pads 217 and 218 are held respectively between clutch drive plate 211 and clutch plate 215 and clutch drive plate 212 and clutch plate 216. Pressure is applied to the clutches by a spring 219 which is urged against gear 209 by nut 220 threadedly received by rod 210. Rod 210 is rotatably received by bearing 221 positioned between gears 213, 214 and rod 210. Likewise, gears 213 and 214 are rotatably mounted by bearings 222 which are positioned in plates 223 and 224. The slip clutches prevent damage to the tubes being expanded and also to apparatus 200. When rods 225 and 226 are extended the maximum distance, the clutches will slip until the operator reverses motor 202.

Shafts 230 and 231 are mounted to plates 224 and 223. Rotatably mounted to shaft 230 are rod driver gears 232 and 233. Likewise, rotatably mounted to shaft 231 are rod driver gears 234 and 235. Rod driver gears 232 and 234 are in meshing engagement with gear 214 whereas rod driver gears 233 and 235 are in meshing engagement with gear 213. Thus, rotation of rod 210 results in the rotation of gears 213, 214 and the rod driver gears 232 through 235.

Idler shafts 236 and 237 are mounted to end plates 223 and 224 with each idler shaft having a pair of rod driver gears which are in meshing engagement with the rod driver gears mounted to rods 230 and 231. For example, idler shaft 236 has a pair of rod driver gears mounted thereto which are in meshing engagement with rod driver gears 232 and 233. Likewise, idler shaft 237 has a pair of rod driver gears mounted thereto which are in meshing engagement with rod driver gears 234 and 235. Rod 226 extends between rod driver gear 232 and the corresponding rod driver gear mounted to idler shaft 236 and between rod driver gear 234 and the corresponding rod driver gear mounted to idler shaft 237. Likewise, rod 225 extends between rod driver gear 233 and the corresponding rod driver gear on idler shaft 236 and between rod driver gear 235 and the corresponding rod driver gear mounted to idler shaft 237. Thus, by activation of the hydraulic motor, rod driver gears 232 through 235 are positively driven thereby moving rods 225 and 226 through rod supports 201, the frame of the apparatus and the movable jaws 250.

The various embodiments of the apparatus which are shown in FIG. 1, FIG. 10 and FIG. 13 may employ the type of movable jaws which are shown in FIG. 2 or FIG. 12. Movable jaws 250 are similar to the movable jaws shown in FIG. 2 with the exception that collar 55 is not included in movable jaws 250 with the enlarged heads of rods 225 and 226 instead contacting directly the converging surfaces of the top and bottom portions of the jaws. In addition, a pair of tubes 251 and 252 are mounted within the jaws and respectively receive rods 225 and 226 thereby limiting the inward movement of the enlarged heads of the rods.

Apparatus 100 and 200 allows the operator to mount different lengths of rods to the main frame depending upon the length of tube to be expanded. The main frame may be used with a variety of different lengths of rods. Likewise, the rod driver gears may be spaced apart different distances depending upon the spacing between the two legs of the U-shaped tube to be expanded.

When expanding tubes with the device disclosed herein, it is important for successful operation that the internal surface of the unexpanded tubes be prelubricated. It is only necessary to ensure that one or two drops of oil are applied to the tube's internal surface near the tube opening. The expander tips will then carry the lubricant into the balance of the tube. The oil may be applied with a brush, a roller or via a spray.

While the invention has been illustrated and described in detail in the drawings and foregoing description, the same is to be considered as illustrative and not restrictive in character, it being understood that only a few embodiments have been shown and described and that all changes and modifications that come within the spirit of the invention are desired to be protected. For example, a plurality of headed rods may be connected to a single piston within a single hollow cylinder.

The invention claimed is:

1. A portable tube expander comprising:
a first hollow elongated element having a first and second end;
a first piston with piston rod affixed thereto both being movable longitudinally in said element, said rod having a headed end;
a first body fixedly connected to said first end of said element preventing movement of said piston through said first end;
a member slidably mounted to said body; and,
movable jaws lockingly engageable peripherally to an end of a tube to be expanded, said jaws being connected to said member and having a chamber with said headed end positionable therein and extendable therefrom.

2. The expander of claim 1 wherein:
said jaws have a top plate and a bottom plate with proximal ends pivotally connected to said member and further comprising:
spring means biasing said top plate and bottom plate together.

3. The expander of claim 2 wherein:
said element is a cylinder; and further comprising:
a first plate fixedly connected to said second end of said cylinder;
a tie rod fixedly connected to said member and extending through said body and said first plate;
a second plate fixedly connected to said tie rod; and, a shaft fixedly connected to said second plate and extending sealingly and slidably into said second end of said cylinder.

4. The expander of claim 3 wherein:
said shaft is hollow and is connectable to a source of hydraulic pressure;
said body has a fluid passage therein communicating with said hollow cylinder and an external source of hydraulic pressure.

5. The expander of claim 2 wherein:
said spring means has a bolt extending through said first and second plate with a helical spring mounted on the bolt urging said first and second plates together.

6. The expander of cliam 2 and further comprising:

a collar slidably mounted on said piston rod and positioned in said chamber, said collar has a cam surface formed thereon engageable with said top and bottom plates forcing said jaws to open as said headed end is retracted.

7. The expander of claim 1 wherein:
said element is a cylinder; and further comprising:
a second hollow cylinder;
a second piston with piston rod affixed thereto, both being movable longitudinally in said second cylinder, said piston rod of said second piston having a headed end positionable in said jaws and extendable therefrom; and wherein:
said body has a passage communicating externally thereof to internally thereof with said first hollow cylinder and said second hollow cylinder.

8. The expander of claim 7 and further comprising:

a first plate fixedly connected to said first cylinder and said second cylinder;

a pair of tie rods fixedly connected to said member and extending through said body and said first plate;

a second plate fixedly connected to said pair of tie rods; and, a pair of shafts fixedly connected to said second plate and extending sealingly into said first cylinder and second cylinder, said shafts are slidable in unison toward and away from said first and second piston.

9. The expander of claim 8 wherein:

said first plate has locking means adjustable to prevent relative movement between said tie rods and said first plate; and, said headed ends of said piston rods of said first piston and said second piston have vents allowing gas in front of said headed ends to flow rearwardly thereof as said headed ends are forced through the tubes being expanded.

10. A tube expander comrising:

a frame;

a pair of rods slidably mounted to said frame, said rods having spherical shaped ends;

tube gripping jaws mounted to said frame with said spherical ends being extendable therefrom;

first means connectable to said frame being operable to force said spherical ends in unison into tubes to be expanded; and, second means mounted to said frame being operable to control the distance said spherical ends are extended from said jaws.

11. The expander of claim 10 wherein:

said rods have opposite piston shaped ends;

said frame has a pair of cylinders housing said piston shaped ends;

said second means is a body with bushings slidably receiving said rods; and further comprising:

a tie rod connected to said jaws and slidably mounted to said body.

12. An apparatus for expanding tubes comprising:

a frame;

a first rod slidably mounted to said frame, said rod having an enlarged end to move through and expand a first tube;

first tube gripping jaws lockingly engageable peripherally to an end of said tube, said jaws mounted to said frame and having an open position when said enlarged end is lodged within and against said jaws and a closed tube gripping position whenever said enlarged end is positioned outside of said jaws; and, first means mounted to said frame being operable to move said rod and said enlarged end through said jaws to open and close said jaws and to move said enlarged end through said tube.

13. The apparatus of claim 12 wherein:

said jaws include a first and second jaw with proximal ends connected together to said frame and free distal ends, said first jaw has an interior surface adjacent said rod; and, said first means is operable to withdraw said enlarged end into said jaws to force said enlarged end against said interior surface of said first jaw and to move said jaws apart to said open position.

14. The apparatus of claim 13 and further comprising:

a second rod slidably mounted to said frame, said rod having a second enlarged end to move through and expand a tube;

second tube gripping jaws lockingly engageable peripherally to a tube end and having an open and closed position; and, said first means is operable to move said second rod and said second enlarged end through said second tube gripping jaws to open and close said second enlarged tube gripping jaws.

15. The apparatus of claim 14 wherein:

said first means includes a cylinder with a first cylinder end and a second cylinder end with said cylinder mounted to said frame, a piston connected to said first rod and sealingly slidable through said cylinder, fluid valve means connecting said first cylinder end and said second cylinder end to a source of pressurized fluid and operable to direct said fluid against said piston to move said first rod.

16. The apparatus of claim 14 wherein:

said first means includes a motor mounted to said frame with a rotatable drive shaft, said first means further includes a first wheel rotatably mounted to said frame and drivingly coupled to said drive shaft, said first wheel has an outer circumferential edge with a portion tangentially aligned and in driving contact with said first rod, said first means is operable to rotate said wheel with said motor to move said first rod into and out of said first jaws and said first tube.

17. The apparatus of claim 16 wherein:

said first means includes a second wheel rotatably mounted to said frame and drivingly coupled to said drive shaft, said second wheel has an outer circumferential edge with a portion tangentially aligned and in contact with said second rod;

said first means is operable to rotate said second wheel with said motor forcing movement of said second rod through said second tube gripping jaws.

18. The apparatus of claim 17 wherein:

said first tube gripping jaws are bifurcated.

* * * * *